Sept. 11, 1951  S. K. HOFFMAN ET AL  2,567,482
LAY SHAFT CONSTRUCTION
Original Filed Feb. 18, 1944

INVENTOR.
SAMUEL K. HOFFMAN
AND HAROLD CAMINEZ, DECEASED
BY HAZEL CAMINEZ, EXECUTRIX

BY Alden D. Redfield
ATTORNEY

Patented Sept. 11, 1951

2,567,482

UNITED STATES PATENT OFFICE 2,567,482

LAY SHAFT CONSTRUCTION

Samuel K. Hoffman, Whittier, Calif., and Harold Caminez, deceased, late of Williamsport, Pa., by Hazel Caminez, executrix, Phoenix, Ariz., assignors to Avco Manufacturing Corporation, a corporation of Delaware Original application February 18, 1944, Serial No. 522,910. Divided and this application November 2, 1949, Serial No. 125,058

9 Claims. (Cl. 74—432)

This invention relates to an improved structural arrangement for a lay shaft or auxiliary geared shaft having a plurality of driving and driven gears secured thereto.

This application is a division of Patent 2,512,103 issued on June 20, 1950 on a Mechanism For Driving Propellers.

It is an object of the present invention to provide a lay shaft unit of improved construction for equalizing the tooth loads on a plurality of gears on a common shaft used for variable speed driving.

The present invention has particular utility in combination with a geared mechanism for driving contra rotating propellers at a plurality of speed ratios relative to a prime mover, such as an aircraft engine. Such a mechanism is described in the parent application of which the present application is a division. This mechanism embodies a plurality of lay shaft units of the type herein disclosed for transmitting power at various speed ratios to a pair of gears which are operatively connected to coaxial, contra rotating aircraft propellers.

Figure 1:
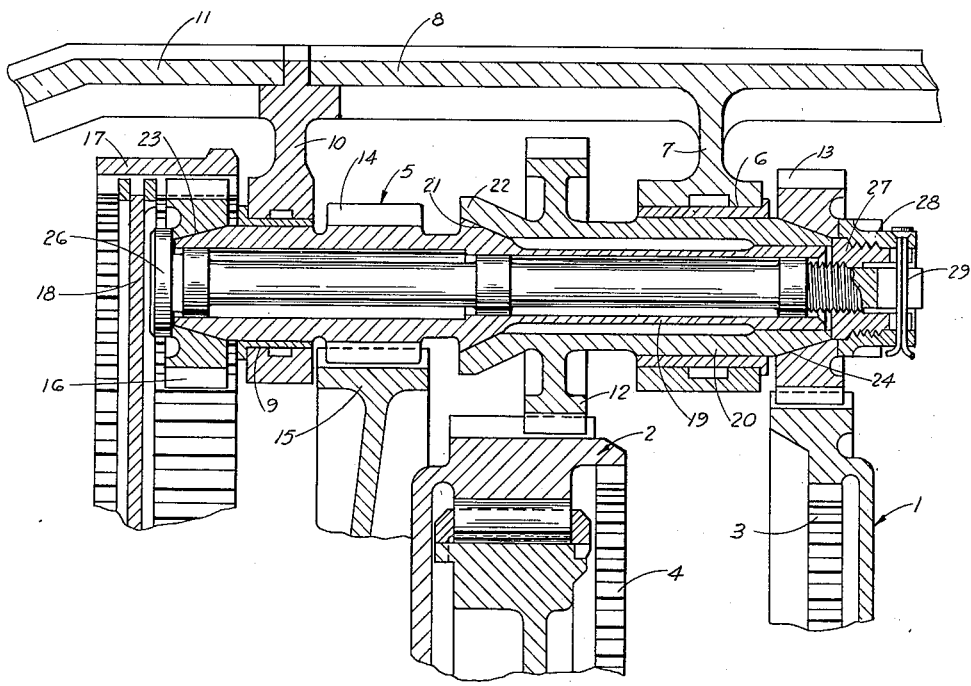
Figure 2:
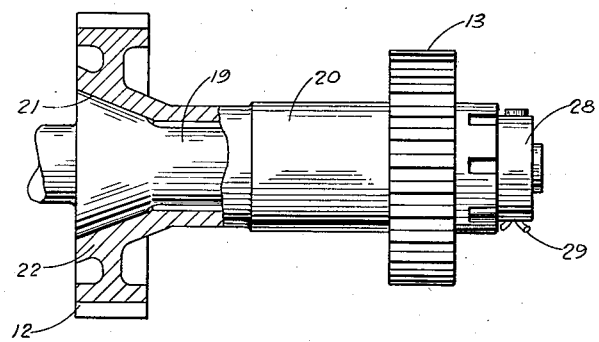

The novel features that are characteristic of the invention are set forth in the appended claims. The invention itself, however, both as to its organization and method of operation, together with additional objects and advantages thereof will best be understood from the following description of a specific embodiment when read in conjunction with the accompanying drawings in which:

Figure 1 is a longitudinal section through one of the lay shaft units and its associated gears; and Figure 2 is a view of a portion of one of the lay shaft units, the low speed driving gear and a portion of the sleeve member being shown in section.

Figures 1 and 2 of this application are reproductions of Figures 7 and 7a, respectively, of the parent application. A new set of reference numerals has been used in this application as a matter of convenience but parts of the original application are included herein to the extent that they describe and claim the lay shaft construction.

With reference to Figure 1, a high speed driving gear, generally designated 1, and a low speed driving gear, generally designated 2, are provided with internal clutch teeth 3 and 4 respectively. These clutch teeth are adapted for alternate engagement with a power driven clutch sleeve (not shown) and transmit power to a lay shaft unit generally designated 5. A plurality of lay shaft units may be employed and spaced circumferentially around the high speed and low speed driving gears to aid in transmitting the power to driven gears connected to the propeller shafts (not shown).

Each lay shaft unit 5 is journaled in a bearing 6 in a wall 7, which is integral with the casing section 8, and a bearing 9 in a plate 10 which is secured by contiguous faces of casing sections 8 and 11 which may be part of the prime mover structure. Each lay shaft unit 5 comprises a low speed gear 12 and a high speed gear 13, a pinion 14 which meshes with and drives a gear 15 secured to one of the propellers and a gear 16 which meshes with and drives a ring gear 17 and wheel body 18 for driving the second propeller. The pitch diameter of pinion 14 and gear 16 on the lay shaft and gears 15 and 17 are proportioned to drive gears 15 and 17 at the same speed in opposite directions for the contra rotation of the associated propeller shafts.

Each lay shaft 5 is composed of sections which are adapted to be conveniently secured together for equal tooth loading of all of the gears on each shaft.

As shown by a comparison of Figs. 1 and 2 the gears 12 on circumferentially alternating lay shaft units 5 are staggered. All of the gears 12 mesh with gear 2, through which the lay shaft units are driven at low speed. Except for this staggered relation of the gears 12 the lay shaft units are alike in construction.

Each unit 5 comprises a hollow inner shaft section 19 and a surrounding sleeve section 20. A pinion 14 is integral with each shaft section 19. A gear 12 is integral with each sleeve section 20. The adjacent shaft sections are interconnected through a plurality of frictionally engaged joints. Each shaft section 19 is provided with a conical portion 21 which fits in a mating conical socket 22 in the sleeve section 20. The front end of each shaft section 19 is provided with a conical portion 23 which fits in a mating conical socket in the gear 16. The rear end of each shaft section 19 is provided with a conical portion 24 which fits into a mating conical socket in gear 13.

A bolt 25 extends completely through the hollow shaft section 19 and is provided with a head 26 which abuts against the front face of gear 16. A nut 27 is screw threaded to the rear end of bolt 25 and abuts against the rear end of sleeve section 20 and is adapted to force together longitudinally the gear 16 into jammed relation with conical portion 23 on shaft section 19, and the sleeve section 20 into jammed relation with the conical portion 21 on shaft section 19. A second nut 28 is screw threaded to nut 27 and is adapted to abut against the rear face of gear 13 and to force the gear 13 into jammed relation with conical portion 24 on sleeve 20. A lock pin 29 extends through nut 28 and nut 27 and a slot in the rear end of bolt 25 and prevents relative rotation of the nuts and the bolt.

In assembling the gearing, the lay shafts are all assembled in their respective bearings 6 and 9 and the nuts 27 are turned sufficiently to move the conical engaging portions of each shaft 19 into loose relation with the conical sockets in the gears 16 and the sleeve section 20. Gear 15 is prevented from rotating by locking its associated propeller against rotation.

Gear 2, which meshes with gears 12 on the sleeve sections 20 of all the lay shaft units, is then rotated in the direction of normal operation while slippage is permitted between conical sections 21 on shafts 19 and the conical sockets 22 of the sleeve section 20. Rotation of gear 2 is continued until the tooth loads of all of the pinions 14 on gear 15 are equalized. Gear 15 and its associated propeller are then released for rotation and the propeller associated with gear 17 is then locked against rotation thus preventing its rotation. Gear 2 is again rotated as before and slippage of conical portions 23 in the conical sockets of gears 16 is then permitted until the tooth loads of all of the gears 16 on gear 17 are equalized. No slippage occurs between conical portions 21 and sockets 22 while slippage is occurring between gears 16 and conical portions 23 because gear 15 and its associated propeller are free to rotate and because of the larger frictional resistance of conical portions 21 compared to the relatively smaller frictional resistance of conical portions 23. The nuts 27 are then tightened on bolts 25 which jams the gears 16 on the conical portions 23 of shafts 19 and the conical portions 21 in the sockets 22 of the sleeve sections 20 which are integral with gears 12, respectively, so that these elements are fixedly secured together for conjoint rotation with equal tooth loading. During the setting of the nut 27, a tool is inserted in the slot in the rear end of bolt 25 to prevent its rotation.

Next, the nuts 28 of the lay shaft units are set to hold the gears 13 for slippage on the conical portions 24 of the sleeve sections 20. The gear 1 which meshes with all of the gears 13 is then rotated in the direction of normal operation while said slippage is permitted which results in uniform distribution of tooth loads on the gears 13. The propellers are locked against rotation while this adjustment is made. The nuts 28 are then tightened to jam and lock the gears 13 on the conical portions 24 of sleeves 20.

This construction renders it unnecessary to accurately index the teeth of each of the gears of each lay shaft unit relative to one another and provides for ready interchangeability of the lay shafts and gears thereon. By holding the bolts 25 against rotation while nuts 27 and 28 are being tightened, no torsional stresses are applied to the bolts which eliminates any spring or twist which might tend to disturb the adjustment of the gear setting.

It will be readily appreciated by those skilled in the art that the preferred embodiment of the invention herein described greatly facilitates the construction of a complex geared mechanism having a multiplicity of lay shafts transmitting power from and to a plurality of meshing gears.

Having described a preferred embodiment of the invention, what is claimed is:

1. In variable speed transmission gearing, a lay-shaft unit comprising an inner shaft section, a sleeve section, said sections being provided respectively with a conical member and a mating socket, gears on the sections, respectively, the inner shaft section being provided at one of its ends with a second conical member, a gear having a conical socket fitting on said second conical member, and means for clamping the shaft sections and the last named gear together longitudinally into driving relation.

2. In variable speed transmission gearing, a lay-shaft unit comprising an inner shaft section, a sleeve section, said sections being provided respectively with a conical member and a mating socket, gears on the sections, respectively, the inner shaft section being provided at one of its ends with a second conical member, a gear having a conical socket fitting on said second conical member, and a bolt extending through the inner shaft section and provided with a head and nut for clamping the shaft-sections and the last named gear together longitudinally into driving relation.

3. In variable speed transmission gearing, a lay-shaft unit comprising an inner shaft section, a sleeve section, said sections being provided respectively with a conical member and a mating socket, gears on the sections, respectively, the inner shaft section being provided at one of its ends with a second conical member, a gear having a conical socket fitting on said second conical member, a conical member on one end of the sleeve-section, a gear having a conical socket fitting on the conical end of the sleeve section, means for clamping the shaft sections and the gear having a socket fitting on the conical member on the end of the inner shaft-section together longitudinally into driving relation, and means for clamping the gear having a socket fitting on the conical member on the end of the sleeve section into driving relation.

4. In variable speed transmission gearing, a lay-shaft unit comprising an inner shaft section, a sleeve section, said sections being provided respectively with a conical member and a mating socket, gears on the sections, respectively, the inner shaft section being provided at one of its ends with a second conical member, a gear having a conical socket fitting on said second conical member, a conical portion on one end of the sleeve section, a gear having a socket fitting on the last named conical portion, a bolt extending through both shaft-sections provided with a head and a nut for clamping together longitudinally the shaft-sections and the gear on the inner shaft section, and a second nut for clamping the second mentioned gear on the sleeve.

5. In variable speed transmission gearing, a lay-shaft unit comprising an inner shaft section, a sleeve section, said sections being provided respectively with an integral conical portion and a mating socket, gears on the sections, respectively, the inner shaft section being provided at one of its ends with a second integral conical portion, a gear having a conical socket fitting on said second conical member, and means for clamping the shaft sections and the last named gear together longitudinally into driving relation.

6. In variable speed transmission gearing, a lay-shaft unit comprising an inner shaft section, a sleeve section, said sections being provided respectively with an integral conical portion and a mating socket, gears integral with the sections, respectively, the inner shaft section being provided at one of its ends with an integral second conical portion, a gear having a conical socket fitting on said second conical portion, and means for clamping the shaft-sections and the last named gear together longitudinally into driving relation.

7. A geared lay-shaft comprising a tubular inner-section and a sleeve section, a conical portion and mating socket between the sections, gears integral with the sections, respectively, conical portions on said inner and sleeve sections at the ends remote from the conical portion and mating socket, gears having sockets mating with the conical end portions, respectively, a bolt extending through the shaft sections and a nut for clamping the shaft sections and the gear on the conical end of the inner-shaft section together, and a second nut threaded to the nut on the bolt for clamping the other gear on the conical end portion of the sleeve section.

8. A geared shaft comprising a plurality of coaxially disposed shaft components, the adjacent shaft components defining a plurality of non-rotatable frictionally engaged joints, the amount of friction between each pair of associated components differing substantially from the friction between every other pair of frictionally engaged components, and means for axially loading said shaft components whereby they may first be lightly loaded while successive rotational adjustments are made in their relative positions and then may be heavily loaded to prevent any relative rotation therebetween.

9. A lay shaft comprising a plurality of coaxially disposed shaft components, the adjacent components defining a plurality of non-rotatable frictionally engaged joints of different frictional resistance, and means for axially loading said plurality of components whereby the frictionally engaged joints may first be lightly loaded while successive rotational adjustments are made in the relative positions of said shaft components, the relative positions of said components associated with the joint of greatest frictional resistance being first adjusted and successive adjustments between the remaining shaft components being made thereafter in the order of progressively decreasing frictional resistance of the associated joints, said components being heavily loaded thereafter by said loading means to prevent further relative rotation.

SAMUEL K. HOFFMAN.
HAZEL CAMINEZ,
*Executrix of the Estate of Harold Caminez, Deceased.*

REFERENCES CITED

The following references are of record in the file of this patent:

UNITED STATES PATENTS

| Number | Name | Date |
|---|---|---|
| 1,602,983 | Ljungstrom | Oct. 12, 1926 |
| 2,091,637 | Hoffman | Aug. 31, 1937 |
| 2,095,794 | Corbin | Oct. 12, 1937 |
| 2,125,456 | McWhirter | Aug. 2, 1938 |
| 2,481,290 | Clarke | Sept. 6, 1949 |
| 2,496,857 | Cronstedt | Feb. 7, 1950 |